US009860478B2

(12) United States Patent
Lee (10) Patent No.: US 9,860,478 B2
(45) Date of Patent: Jan. 2, 2018

(54) ELECTRONIC DEVICE AND BROADCASTING SIGNAL RECEIVER

(71) Applicant: LG ELECTRONICS INC., Seoul (KR)

(72) Inventor: Jaehun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 492 days.

(21) Appl. No.: 14/518,353

(22) Filed: Oct. 20, 2014

(65) Prior Publication Data

US 2015/0115744 A1    Apr. 30, 2015

(30) Foreign Application Priority Data

Oct. 31, 2013   (KR) .................. 10-2013-0130949

(51) Int. Cl.
*H04N 5/63* (2006.01)

(52) U.S. Cl.
CPC ............ *H04N 5/63* (2013.01); *Y10T 307/832* (2015.04)

(58) Field of Classification Search
CPC ............................... H04N 5/63; Y10T 307/832
See application file for complete search history.

(56) References Cited

U.S. PATENT DOCUMENTS

| | | | | |
|---|---|---|---|---|
| 4,398,098 A * | 8/1983 | Minchey | ................ | H03K 17/22 307/140 |
| 6,191,760 B1 * | 2/2001 | Jun | ........................ | G09G 5/10 345/20 |
| 6,906,476 B1 * | 6/2005 | Beatenbough | ......... | H05B 41/40 315/209 R |
| 7,288,857 B2 * | 10/2007 | Bartholomew | ......... | H02J 9/061 307/140 |
| 7,908,414 B2 * | 3/2011 | Combs | .................... | G06F 1/266 710/10 |
| 8,575,892 B2 * | 11/2013 | Kim | ...................... | H02J 7/0036 318/568.12 |
| 2003/0084356 A1 * | 5/2003 | Park | ........................ | H04L 12/10 713/300 |
| 2005/0141208 A1 * | 6/2005 | Niinuma | ................. | G06F 1/263 361/797 |
| 2009/0055663 A1 * | 2/2009 | Chen | ................... | H01L 27/0248 713/300 |
| 2010/0052620 A1 * | 3/2010 | Wong | ..................... | H02J 7/0055 320/137 |
| 2010/0298029 A1 * | 11/2010 | Jang | ........................ | G06F 1/266 455/557 |

(Continued)

*Primary Examiner* — Thienvu Tran
*Assistant Examiner* — Pinping Sun
(74) *Attorney, Agent, or Firm* — Birch, Stewart, Kolasch & Birch, LLP (57) ABSTRACT

An electronic device and a broadcasting signal receiver including the same are disclosed. The electronic device includes a power supply unit supplying electric power and a connector including a plurality of pins. When a jack of a first external device having a self power source is connected to the connector, the power supply unit does not supply the electric power to the first external device through the connector. When a jack of a second external device not having a self power source is connected to the connector, the power supply unit supplies the electric power to the second external device through the connector.

8 Claims, 11 Drawing Sheets

(56) References Cited

U.S. PATENT DOCUMENTS

2011/0025262 A1* 2/2011 Fischer .............. H01R 13/6675
320/107
2012/0226921 A1* 9/2012 Kim ....................... G09G 5/006
713/310

* cited by examiner

| Connection state | Electric power |
|---|---|
| Non-connection | Cut-off of electric power |
| First external device | Cut-off of electric power |
| Second external device | Supply of electric power |

ELECTRONIC DEVICE AND BROADCASTING SIGNAL RECEIVER

CROSS-REFERENCE TO RELATED APPLICATIONS

Pursuant to 35 U.S.C. §119(a), this application claims the benefit of earlier filing date and right of priority to Korean Patent Application No. 10-2013-0130949 filed on Oct. 31, 2013, the contents of which are incorporated by reference herein in their entirety.

TECHNICAL FIELD

Embodiments of the invention relate to an electronic device and a broadcasting signal receiver including the same.

DISCUSSION OF THE RELATED ART

In general, a display device such as a broadcasting signal receiver (for example, television), which receives data stream transmitted in real time streaming technique through a network, such as internet, and has a network function of decoding and signal processing of audio and video signals, has been widely distributed and used.

When an external device having an internal power source is connected to a connector having a power supply function in a related art broadcasting signal receiver, a malfunction of the external device connected to the connector may be generated.

SUMMARY

Embodiments of the invention provide an electronic device and a broadcasting signal receiver including the same capable of cutting off the supply of electric power to an external device when the external device having an internal power source is connected to a connector having a power supply function.

In one aspect, there is an electronic device comprising a power supply unit configured to supply electric power and a connector including a plurality of pins, wherein when a jack of a first external device having a self power source is connected to the connector, the power supply unit does not supply the electric power to the first external device through the connector, wherein when a jack of a second external device not having a self power source is connected to the connector, the power supply unit supplies the electric power to the second external device through the connector.

The connector may include at least one power pin, at least one ground pin, and at least one control pin.

The connector may further include at least one data pin.

When the jack of the first external device is connected to the connector, a difference between a voltage of the control pin and a voltage of the ground pin may be greater than a predetermined reference voltage. Further, when the jack of the second external device is connected to the connector, the difference between the voltage of the control pin and the voltage of the ground pin may be less than the predetermined reference voltage.

The power supply unit may include a first power source, a first switch disposed between the first power source and the ground, a first resistor and a second resistor disposed in series between a control terminal of the first switch and the control pin, a third resistor disposed between a first node between the first resistor and the second resistor and the first power source, and a fourth resistor disposed between the first power source and the first switch. A logic level of a second node between the fourth resistor and the first switch may be used as a control signal for determining whether or not to supply the electric power to the external device connected to the connector.

The power supply unit may further include a second power source and a second switch disposed between the second power source and the power pin. The logic level of the second node may be used as a control signal for turning on or off the second switch.

The power supply unit may further include a third switch disposed between a control terminal of the second switch and the ground, a fifth resistor disposed between a third node between the second power source and the second switch and a fourth node between the control terminal of the second switch and the third switch, and a sixth resistor disposed between the fourth node and the third switch. A control signal for a turn-on or turn-off operation may be supplied to a control terminal of the third switch depending on the logic level of the second node.

The electronic device and the broadcasting signal receiver including the same according to the embodiments of the invention may prevent a malfunction of the external device connected to the connector even if the external device having the internal power source is connected to the connector having the power supply function.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Figure 1:
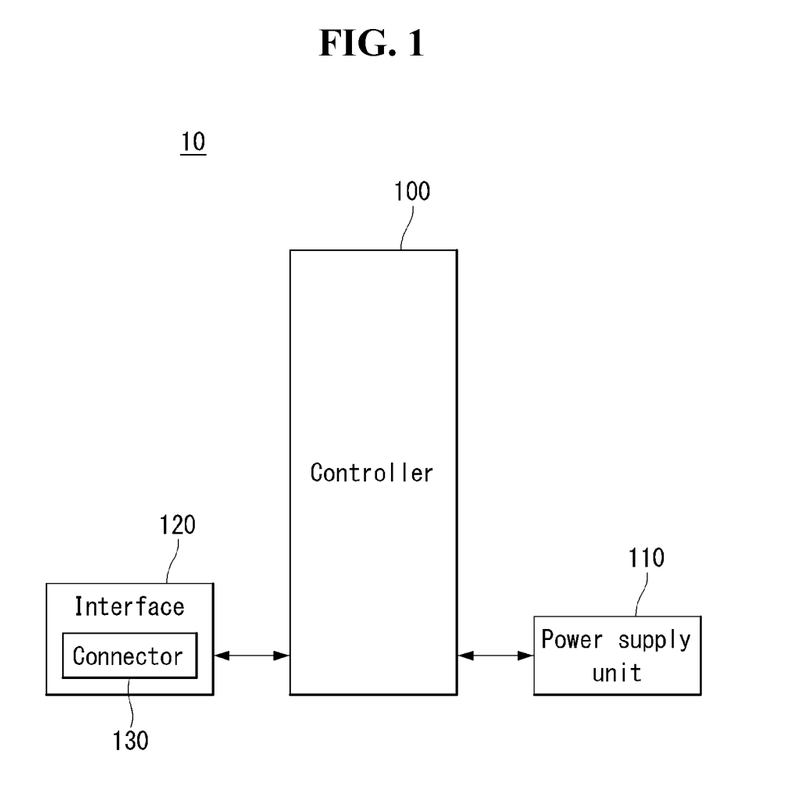
FIGS. 1 and 2 illustrate configuration of an electronic device and a broadcasting signal receiver according to an exemplary embodiment of the invention.
Figure 2:
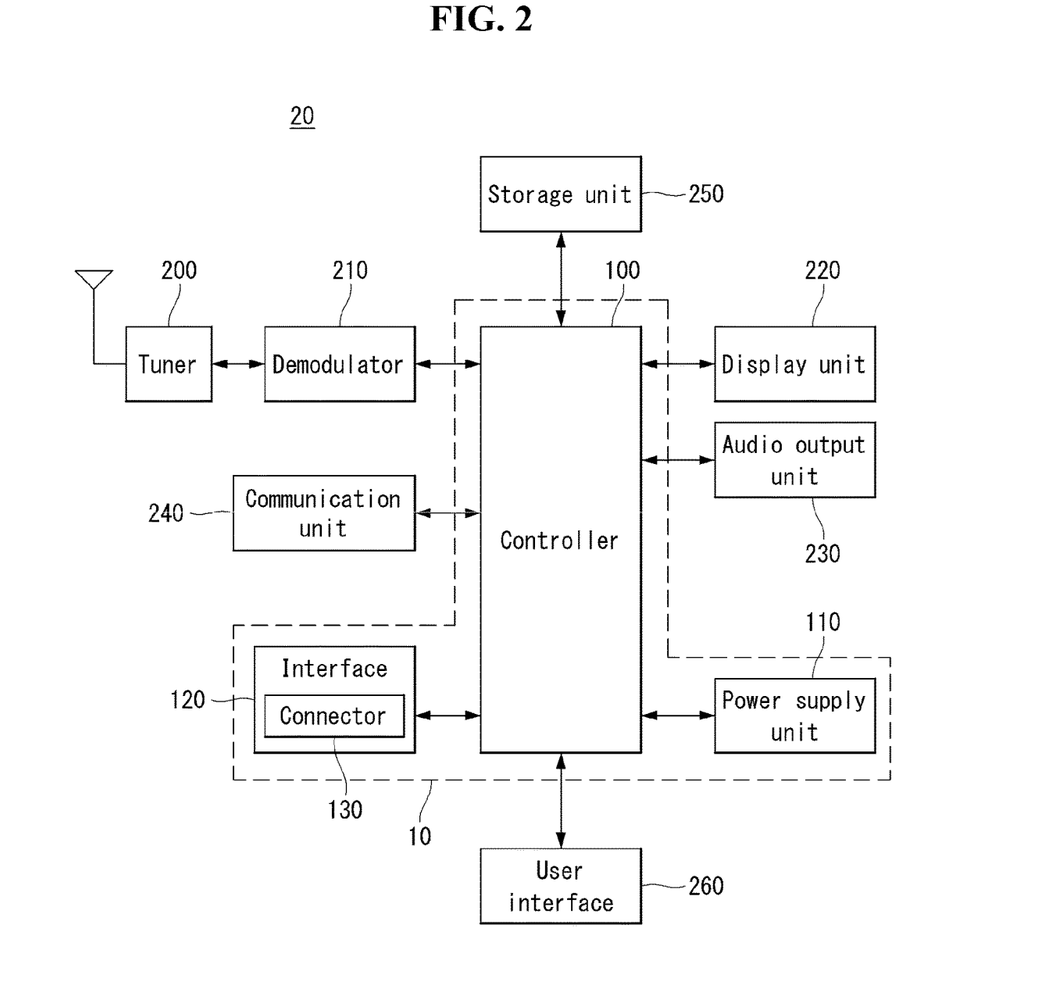

FIGS. 1 and 2 illustrate configuration of an electronic device and a broadcasting signal receiver according to an exemplary embodiment of the invention.

As shown in FIG. 1, an electronic device 10 according to the embodiment of the invention may include a power supply unit 110 and an interface 120. The electronic device 10 may further include a controller 100 which controls the power supply unit 110 and the interface 120 and entirely controls a function of the electronic device 10.

The electronic device 10 according to the embodiment of the invention may be connected to an external device (not shown) through the interface 120. For this, the interface 120 may include a connector 130 including a plurality of pins.

The interface 120 may transmit an image signal, an audio signal, a data signal, etc., which are received from the outside through the external device, to the controller 100. Further, the image signal, the audio signal, or the data signal processed by the controller 100 may be output to the external device.

The electronic device 10 according to the embodiment of the invention may be applied to various electronics. For example, a broadcasting signal receiver may include the electronic device 10. In other words, the electronic device 10 according to the embodiment of the invention may be a part constituting the broadcasting signal receiver. This is described below with reference to FIG. 2.

As shown in FIG. 2, a broadcasting signal receiver 20 according to the embodiment of the invention may include a display unit 220 for displaying an image.

The display unit 220 may be referred to as a display panel.

The broadcasting signal receiver 20 may further include a tuner 200, a demodulator 210, a communication unit 240, a storage unit 250, an audio output unit 230, and a user interface 260.

The audio output unit 230 may output sound under the control of the controller 100.

The tuner 200 tunes a radio frequency (RF) broadcasting signal, which corresponds to a channel selected by a user or all of previously stored channels, among RF broadcasting signals received through an antenna. Further, the tuner 200 converts the tuned RF broadcasting signal into a middle frequency signal, a base band image signal, or an audio signal.

The demodulator 210 receives a digital IF signal DIF converted by the tuner 200 and performs a demodulating operation.

The demodulator 210 performs the demodulation and the channel decoding and then may output a stream signal TS. In this instance, the stream signal TS may be a multiplexing signal of the image signal, the audio signal, and the data signal.

The stream signal TS output by the demodulator 210 may be input to the controller 100.

The controller 100 performs demultiplexing, the processing of the image signal and the audio signal, etc. Then, the controller 100 outputs an image to the display unit 220 and outputs the sound to the audio output unit 230.

The communication unit 240 may provide an interface for connecting the broadcasting signal receiver 20 to a wired/wireless network including an internet network.

The communication unit 240 may transmit or receive data to or from another user or another electronic device through the connected network or another network linked to the connected network.

The storage unit 250 may store a program for the signal processing and the control operation of the controller 100 and may store the processed image signal, the processed audio signal, or the processed data signal.

The storage unit 250 may store information about a predetermined broadcasting channel through a channel memory function.

The broadcasting signal receiver 20 may play a content file (for example, a video file, a still image file, a music file, a document file, an application file, etc,) stored in the storage unit 250 and may provide the content file to the user.

The user input interface 260 may transfer a command the user inputs to the controller 100.

For example, the user input interface 260 may transfer various commands including the power on/off, a channel selection, the screen setting, the volume control, a movement of a cursor on the screen, a menu selection, etc., which the user inputs using command input means, to the controller 100.

The controller 100 may control the entire operation of the broadcasting signal receiver 20.

For example, the controller 100 may perform the demultiplexing processing on a stream input through the tuner 200, the communication unit 240, etc. or may perform the processing of demultiplexed signals, thereby generating and outputting the signals for outputting the image or the sound.

The image signal processed by the controller 100 may be input to the display unit 220 and may be displayed as an image corresponding to the image signal. Further, the image signal processed by the controller 100 may be input to an external device through the interface 120.

The audio signal processed by the controller 100 may be output to the audio output unit 230. Further, the audio signal processed by the controller 100 may be input to the external device through the interface 120.

The configuration of the broadcasting signal receiver 20 according to the embodiment of the invention is not limited to the configuration shown in FIG. 2. For example, although not shown, the broadcasting signal receiver 20 may include an audio sensing unit for sensing the sound and a motion sensing unit for sensing a motion, such as a user's motion.

FIGS. 3 to 11 illustrate in detail configuration of the electronic device and the broadcasting signal receiver according to the embodiment of the invention. In the following description, the descriptions of the configuration and the structure described above may be briefly made or may be entirely omitted. Further, the broadcasting signal receiver 20 was taken as an example of the embodiment of the invention for the sake of brevity and ease of reading. However, the embodiment of the invention may be applied to display devices other than the broadcasting signal receiver 20.

Figure 3:
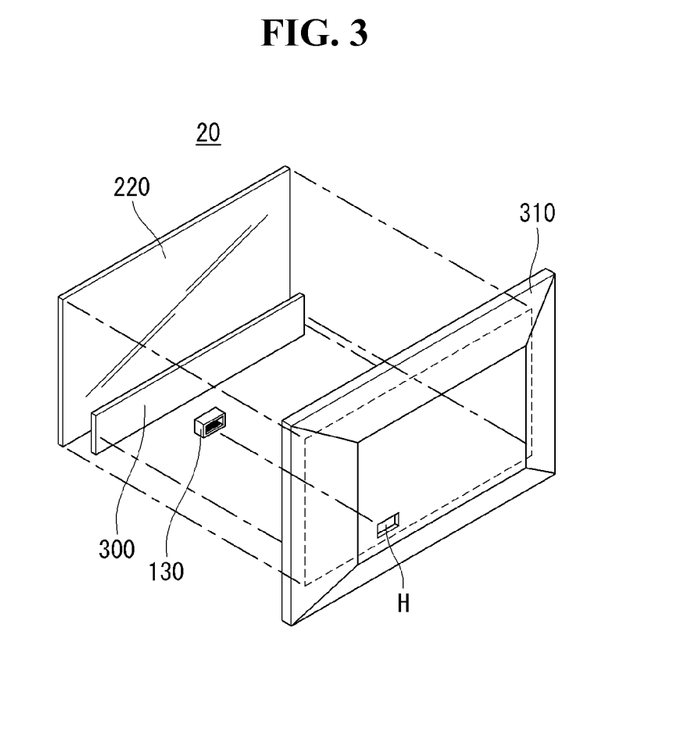
FIGS. 3 to 11 illustrate in detail configuration of an electronic device and a broadcasting signal receiver according to an exemplary embodiment of the invention.

As shown in FIG. 3, the broadcasting signal receiver 20 may include a display unit 220, a driving board 300 positioned in the rear of the display unit 220, and a cover 310 positioned in the rear of the display unit 220 and the driving board 300.

The broadcasting signal receiver 20 may further include a connector 130 electrically connected to the driving board 300.

The cover 310 may have a hole H corresponding to the connector 130.

The driving board 300 may include at least one of the controller 100, the power supply unit 110, the tuner 200, the demodulator 210, the audio output unit 230, the communication unit 240, the storage unit 250, and the user interface 260 described above with reference to FIGS. 1 and 2.

Figure 4:
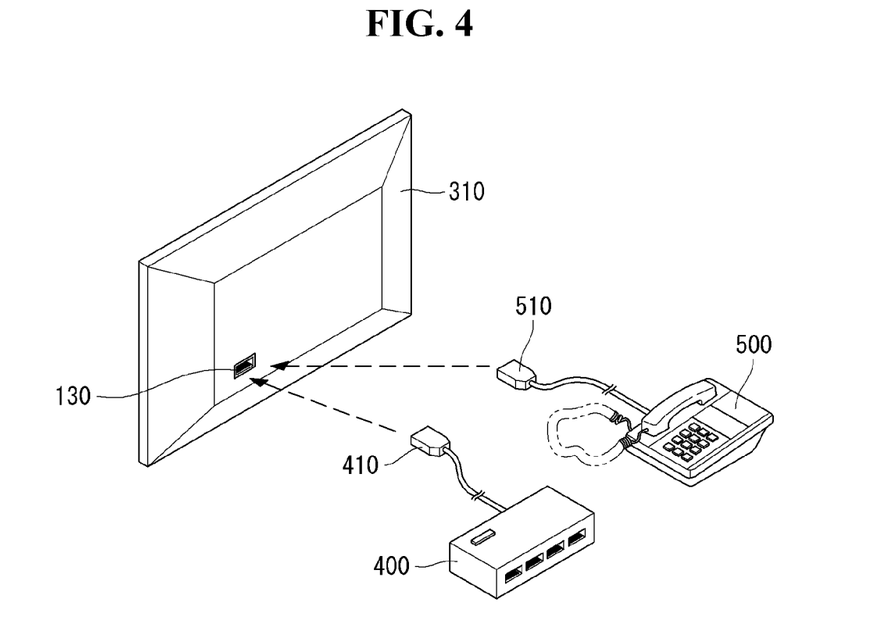

As shown in FIG. 4, the connector 130 may be exposed through the hole H of the cover 310 in a state where the display unit 220 and the cover 310 are assembled, i.e., a state where the broadcasting signal receiver 20 is completed.

Further, various external devices 400 and 500 may be connected to the broadcasting signal receiver 20 through the connector 130.

The first external device 400 may have a self power source.

Examples of the first external device 400 having the self power source include HUB and modem.

A first jack 410 included in the first external device 400 may be LAN jack.

Because the first external device 400 receives electric power required to drive from the self power source, the first external device 400 does not need to receive the electric power from another device, for example, the broadcasting signal receiver 20.

The second external device 500 may not have a self power source.

Examples of the second external device 500 not having the self power source include IP telephone.

A second jack 510 included in the second external device 500 may be RJ45 jack.

Because the second external device 500 does not have the self power source, the second external device 500 has to receive the electric power from another device, for example, the broadcasting signal receiver 20.

The second external device 500 may be connected to the broadcasting signal receiver 20 by connecting its second jack 510 to the connector 130. For example, when the second jack 510 is RJ45 jack, the connector 130 may be a connector based on RJ45.

A method for supplying the electric power to the external device through the connector 130 is described below.

Figure 5:
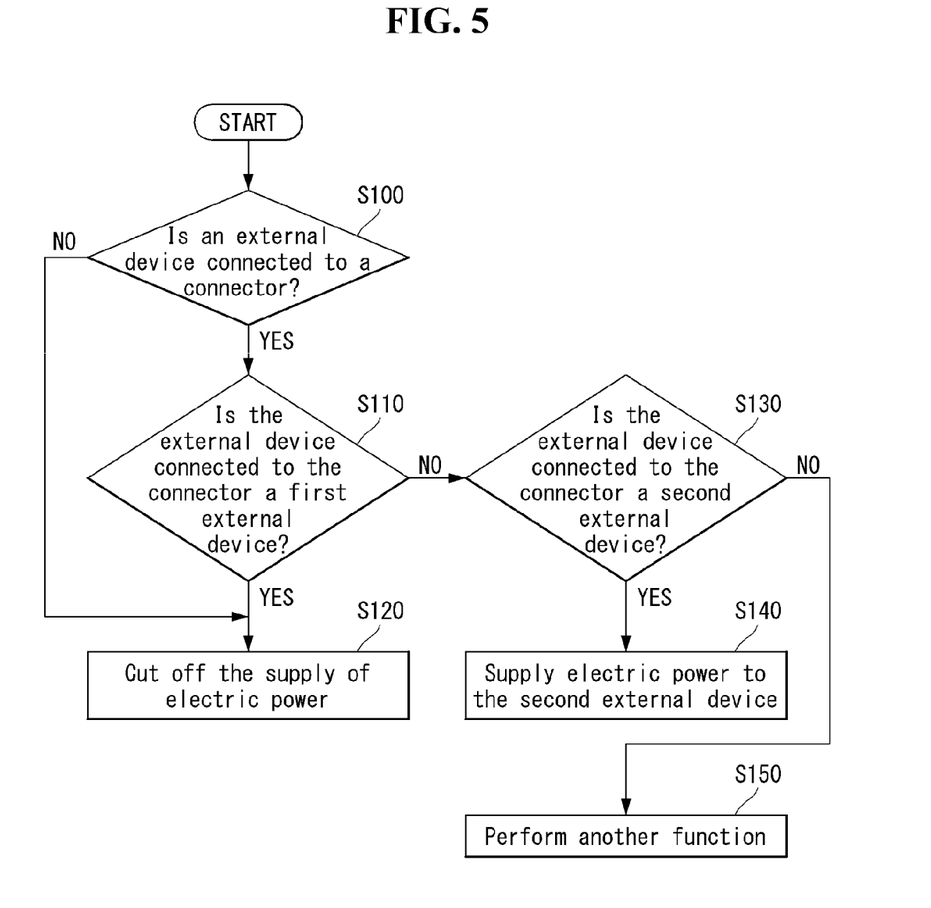

As shown in FIG. 5, it may be decided whether or not the external device is connected to the connector 130 in step S100.

When the external device is connected to the connector 130 as the result of a decision, it may be decided whether or not the external device connected to the connector 130 is the first external device 400 in step S110.

When the external device connected to the connector 130 is the first external device 400 having the self power source as the result of a decision, the electric power may not be supplied to the first external device 400 in step S120.

On the other hand, when the external device connected to the connector 130 is not the first external device 400 as the result of a decision in step S110, it may be decided whether or not the external device connected to the connector 130 is the second external device 500 in step S130.

When the external device connected to the connector 130 is the second external device 500 not having the self power source as the result of a decision, the broadcasting signal receiver 20 may supply the electric power to the second external device 500 through the connector 130 in step S140.

Further, when the external device connected to the connector 130 is not the second external device 500 as the result of a decision in step S130, the broadcasting signal receiver 20 may perform another function, which is previously determined, in step S150.

As described above, the second external device 500 not having the self power source may receive the electric power from the broadcasting signal receiver 20 in a state where the second external device 500 is connected to the broadcasting signal receiver 20.

When the first jack 410 is LAN jack and the second jack 510 is RJ45 jack, the first jack 410 and the second jack 510 may have the similar shape.

Hence, the user may connect the first jack 410 to the connector 130 by mistake.

As described above, when the first jack 410 is connected to the connector 130, the broadcasting signal receiver 20 cuts off the supply of electric power to the first external device 400. Hence, the malfunction of the first external device 400 may be prevented.

A configuration and a driving method of the power supply unit 110, which cuts off the electric power when the first jack 410 is connected to the connector 130 and supplies the electric power when the second jack 510 is connected to the connector 130, are described in detail below with reference to FIG. 6.

Figure 6:
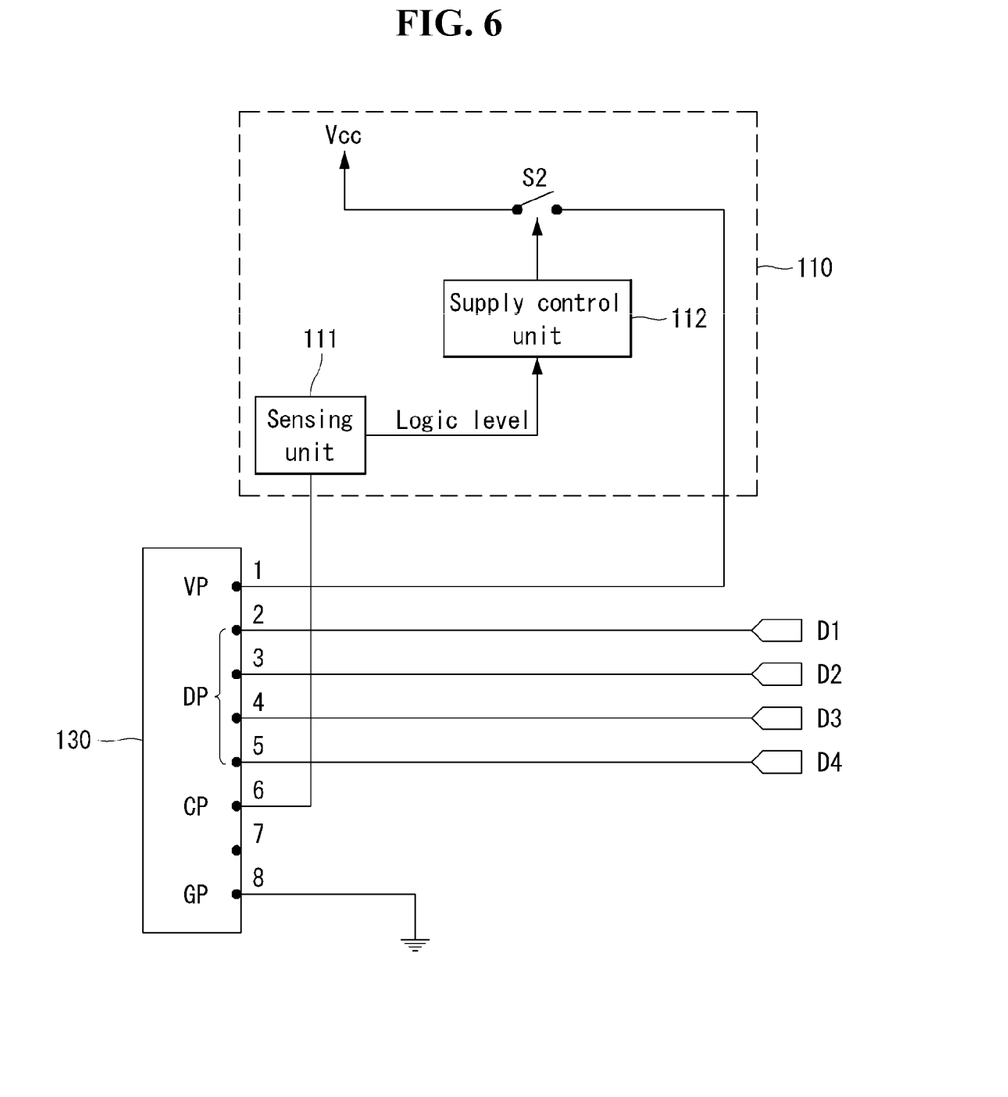

As shown in FIG. 6, the connector 130 may include at least one power pin VP, at least one ground pin GP, and at least one control pin CP.

The connector 130 may further include at least one data pin DP.

For example, the connector 130 may include a total of eight pins 1 to 8. In this instance, the first pin 1 may serve as the power pin VP; the sixth pin 6 may serve as the control pin CP; the eighth pin 8 may serve as the ground pin GP; the second to fifth pins 2 to 5 may serve as the data pin DP; and the seventh pin 7 may serve as an internal ground pin.

The power supply unit 110 may include a second switch S2 positioned between a second power source supplying a second power voltage Vcc and the power pin VP. Hereinafter, the second power source may be indicated by 'Vcc' for the sake of brevity and ease of reading.

The power supply unit 110 may further include a sensing unit 111 for sensing the connection between the connector 130 and the external device and a supply control unit 112 for controlling the turn-on or turn-off of the second switch S2 based on information sensed by the sensing unit 111.

Figure 7:
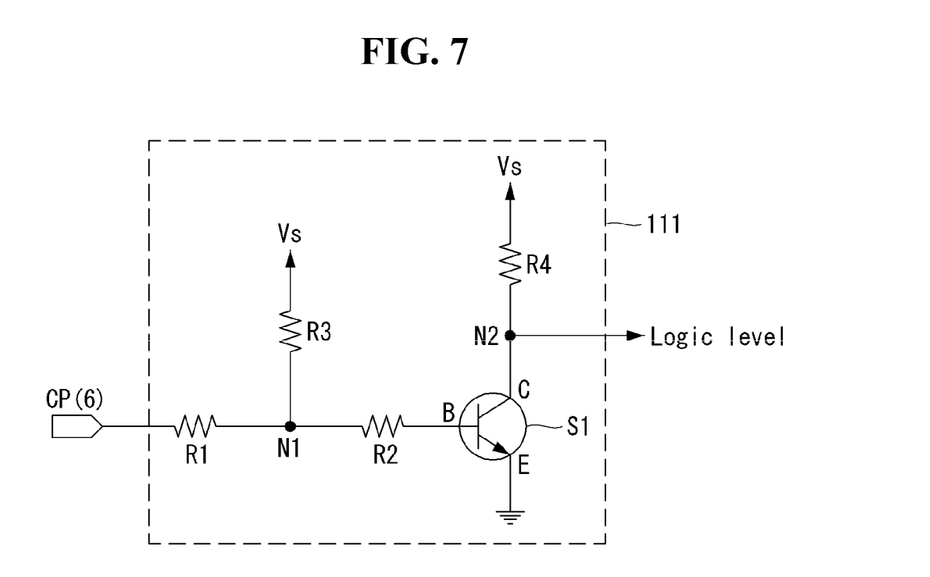

As shown in FIG. 7, the sensing unit 111 may include a first power source supplying a first power voltage Vs, a first switch S1, a first resistor R1, a second resistor R2, a third resistor R3, and a fourth resistor R4.

Hereinafter, the first power source may be indicated by 'Vs' for the sake of brevity and ease of reading.

The first power voltage Vs may be less than the second power voltage Vcc.

The first switch S1 may be disposed between the first power source and the ground. FIG. 7 shows a bipolar junction transistor (BJT) as an example of the first switch S1. However, the embodiment of the invention is not limited thereto.

The first resistor R1 and the second resistor R2 may be disposed between a control terminal of the first switch S1, for example, a base B of the first switch S1 and the control pin CP.

The third resistor R3 may be disposed between a first node N1 between the first resistor R1 and the second resistor R2 and the first power source. A resistance of the second resistor R2 may be greater than resistances of the first resistor R1 and the third resistor R3. The resistance of the third resistor R3 may be greater than the resistance of the first resistor R1.

The fourth resistor R4 may be disposed between the first power source and the first switch S1. For example, the fourth resistor R4 may be disposed between the first power source and a collector C of the first switch S1. Further, an emitter E of the first switch S1 may be connected to the ground.

Figure 8:
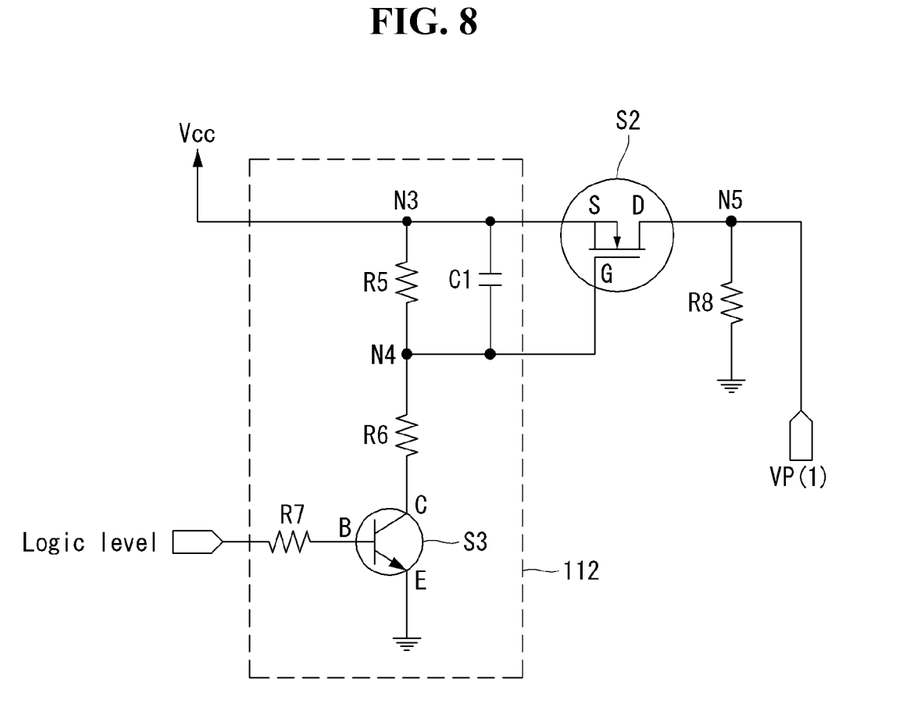

As shown in FIG. 8, the supply control unit 112 may include a third switch S3, a fifth resistor R5, and a sixth resistor R6.

The third switch S3 may be disposed between a control terminal of a second switch S2, for example, a gate terminal G of the second switch S2 and the ground.

The fifth resistor R5 may be disposed between a third node N3 between the second power source and the second switch S2 and a fourth Node N4 between the control terminal of the second switch S2 and the third switch S3.

The sixth resistor R6 may be disposed between the fourth Node N4 and the third switch S3.

The supply control unit 112 may further include a seventh resistor R7 connected to a control terminal of the third switch S3, for example, a base B of the third switch S3 and a first capacitor C1 connected in parallel to the fifth resistor R5 between the third node N3 and the fourth Node N4.

An emitter E of the third switch S3 may be connected to the ground.

FIG. 8 shows a bipolar junction transistor (BJT) as an example of the third switch S3. However, the embodiment of the invention is not limited thereto.

A source terminal S of the second switch S2 may be connected to the third node N3, and a drain terminal D of the second switch S2 may be connected to the power pin VP.

The power supply unit 110 may further include an eighth resistor R8 disposed between a fifth node N5 between the power pin VP and the second switch S2 and the ground.

FIG. 8 shows a field effect transistor (FET) as an example of the second switch S2. However, the embodiment of the invention is not limited thereto.

A logic level of a second node N2 between the fourth resistor R4 and the first switch S1 of the sensing unit 111 may be used as a control signal for determining whether or not to supply the electric power to the external device connected to the connector 130.

In other words, the logic level of the second node N2 may be used as the control signal allowing the supply control unit 112 to turn on or off the second switch S2. For this, a control signal for a turn-on or turn-off operation may be supplied to the control terminal of the third switch S3 depending on the logic level of the second node N2.

FIGS. 6 to 8 show that the logic level of the second node N2 of the sensing unit 111 is supplied to the base B of the third switch S3 of the supply control unit 112. However, the embodiment of the invention is not limited thereto.

For example, the logic level of the second node N2 of the sensing unit 111 may be input to the controller 100 shown in FIGS. 1 and 2, and the controller 100 may supply a control signal for controlling the turn-on or the turn-off of the third switch S3 to the base B of the third switch S3 depending on the logic level.

Figure 9:
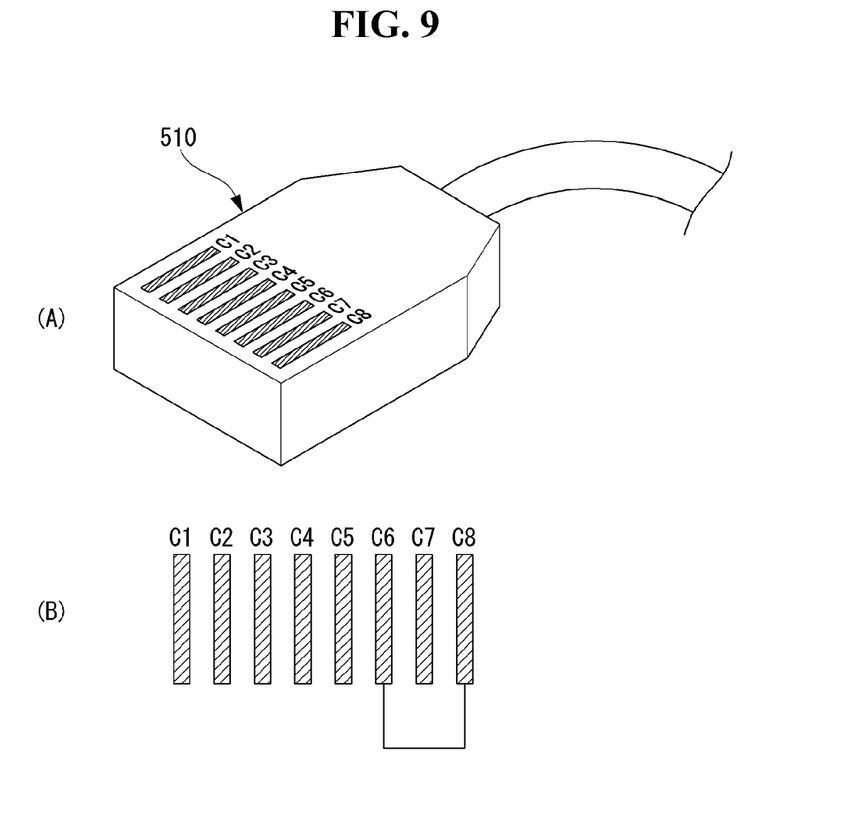

As shown in FIG. 9, the second jack 510 of the second external device 500 connected to the connector 130 may include a plurality of input pins C1 to C8 corresponding to a plurality of pins of the connector 130.

As shown in FIGS. 6 and 9, the first input pin C1 of the second jack 510 may correspond to the power pin VP; the sixth input pin C6 of the second jack 510 may correspond to the control pin CP; the eighth input pin C8 of the second jack 510 may correspond to the ground pin GP; and the second to fifth input pins C2 to C5 of the second jack 510 may correspond to the data pin DP.

In the second jack 510 of the second external device 500, the sixth input pin C6 corresponding to the control pin CP and the eighth input pin C8 corresponding to the ground pin GP are short-circuited. Hence, a difference between a voltage of the control pin CP and a voltage of the ground pin GP in a state where the second jack 510 is connected to the connector 130 may be less than a predetermined reference voltage. The voltage of the control pin CP may be substantially the same as the voltage of the ground pin GP in a state where the second jack 510 is connected to the connector 130.

Figure 10:
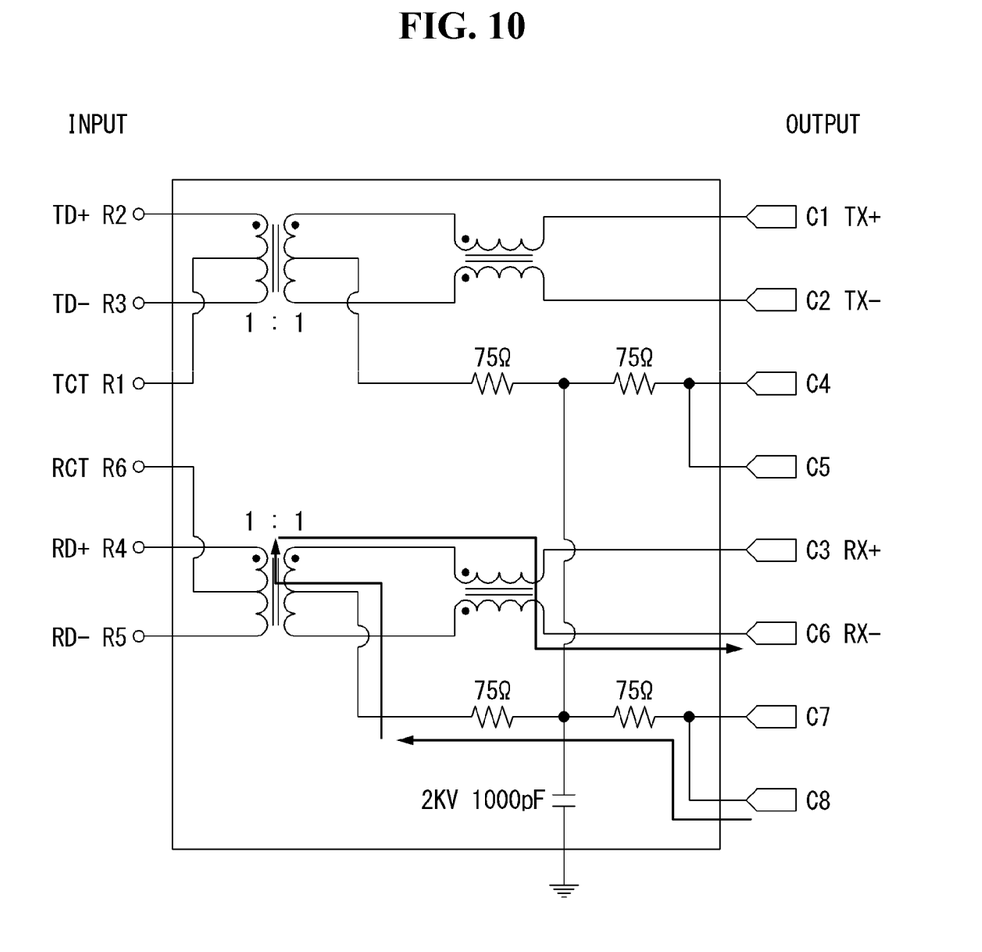

FIG. 10 shows an example of an internal structure of the first external device 400.

More specifically, FIG. 10 shows an internal structure of LAN equipment as an example of the first external device 400.

As shown in FIG. 10, the first jack 410 of the first external device 400 may include first to eighth input pins C1 to C8 in the same manner as the second jack 510 of the second external device 500.

If the first jack 410 is connected to the connector 130, the first input pin C1 of the first jack 410 may correspond to the power pin VP, the sixth input pin C6 of the first jack 410 may correspond to the control pin CP, and the eighth input pin C8 of the first jack 410 may correspond to the ground pin GP. Further, the second to fifth input pins C2 to C5 of the first jack 410 may correspond to the data pin DP.

In the first jack 410 of the first external device 400, the sixth input pin C6 corresponding to the control pin CP and the eighth input pin C8 corresponding to the ground pin GP are not short-circuited.

An equivalent resistance between the sixth input pin C6 and the eighth input pin C8 calculated along an inner path of the first external device 400 indicated by an arrow of FIG. 10 may be 150Ω.

Hence, a difference between a voltage of the control pin CP and a voltage of the ground pin GP in a state where first jack 410 is connected to the connector 130 may be greater than the predetermined reference voltage. The difference between the voltage of the control pin CP and the voltage of the ground pin GP may be determined depending on the equivalent resistance (i.e., 150Ω) between the sixth input pin C6 and the eighth input pin C8.

A method for cutting off and supplying the electric power when the first jack 410 is connected to the connector 130 and when the second jack 510 is connected to the connector 130 is described in detail below.

It is assumed that the first resistor R1 is 220Ω, the second resistor R2 is 10 kΩ, the third resistor R3 is 1 kΩ, the fourth resistor R4 is 10 kΩ, the fifth resistor R5 is 22 kΩ the sixth resistor R6 is 27 kΩ, the seventh resistor R7 is 10 kΩ, the eighth resistor R8 is 10 kΩ, the first power voltage Vs is 3.5 V, the second power voltage Vcc is 12 V, and a driving voltage of the first switch S1 is about 0.7V for the sake of brevity and ease of reading. The embodiment of the invention is not limited thereto.

First, a state (i.e., non-connection state) where the external device is not connected to the connector 130 is described.

Because the control pin CP is electrically opened in the non-connection state, the first power voltage Vs of 3.5 V may exist between the second resistor R2 and the third resistor R3 of the sensing unit 111. Namely, the voltage of the base B of the third switch S3 may be about 3.5 V.

Hence, the logic level of the second node N2 may be 'zero (0)'.

Then, the third switch S3 may be turned off, and the second switch S2 may be turned off. Hence, the supply of the electric power may be cut off.

A state where the first jack 410 of the first external device 400 is connected to the connector 130 is described below.

When the first jack 410 of the first external device 400 is connected to the connector 130, a predetermined equivalent resistance, for example, 150Ω may exist between the control pin CP and the ground pin GP.

Then, the equivalent resistance of 150Ω and the first resistor R1 may be positioned in series between the first node N1 and the ground. Hence, a total of 370Ω may exist between the first node N1 and the ground.

As a result, the voltage of the base B of the third switch S3 may be about 0.85 V.

Further, the logic level of the second node N2 may be 'zero (0)'.

Then, the third switch S3 may be turned off, and the second switch S2 may be turned off. Hence, the supply of the electric power may be cut off.

As described above, when the first external device 400 having the self power source is connected to the connector 130, the supply of the electric power to the first external device 400 may be cut off, so as to prevent the malfunction of the broadcasting signal receiver 20 and/or the first external device 400.

When the second jack 510 of the second external device 500 is connected to the connector 130, the voltage of the control pin CP and the voltage of the ground pin GP may be almost equal to each other. Hence, only the first resistor R1 may exist between the first node N1 and the ground.

As a result, the voltage of the base B of the third switch S3 may be about 0.55 V.

Hence, the logic level of the second node N2 may be '1'.

Then, the third switch S3 may be turned on, and the second switch S2 may be turned on. Hence, the electric power may be supplied to the second external device 500 through the connector 130 and the second jack 510.

Figure 11:
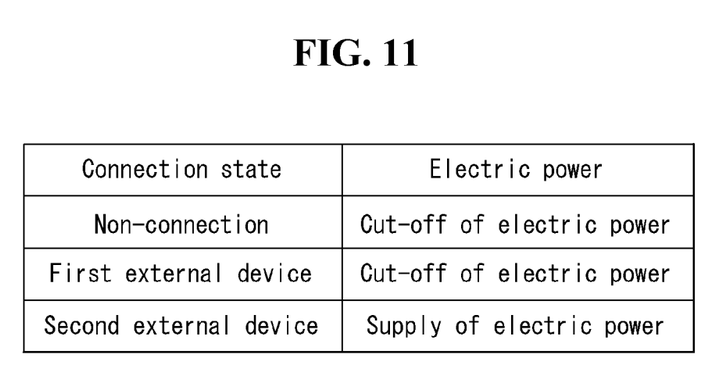

Conditions of the supply and the cut-off of the electric power are shown in FIG. 11.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
   a connector including a plurality of pins, including at least one power pin and at least one control pin; and
   a power supply unit configured to supply electric power and comprising:
      a first power source;
      a first switch disposed between the first power source and a ground;
      a first resistor and a second resistor disposed in series between a control terminal of the first switch and the control pin;
      a third resistor disposed between a first node between the first resistor and the second resistor and the first power source; and
      a fourth resistor disposed between the first power source and the first switch,
      wherein a logic level of a second node between the fourth resistor and the first switch is used as a control signal for determining whether or not to supply the electric power to an external device connected to the connector,
   wherein when a jack of a first external device having a self power source is connected to the connector, the power supply unit does not supply the electric power to the first external device through the connector,
   wherein when a jack of a second external device not having a self power source is connected to the connector, the power supply unit supplies the electric power to the second external device through the connector,
   wherein the power supply unit further includes:
      a second power source;
      a second switch disposed between the second power source and the power pin;
      a third switch disposed between a control terminal of the second switch and the ground;
      a fifth resistor disposed between a third node between the second power source and the second switch and a fourth node between the control terminal of the second switch and the third switch; and
      a sixth resistor disposed between the fourth node and the third switch,
   wherein the logic level of the second node is used as a control signal for turning on or off the second switch, and
   wherein a control signal for a turn-on or turn-off operation is supplied to a control terminal of the third switch depending on the logic level of the second node.

2. The electronic device of claim 1, wherein the connector further includes at least one ground pin.

3. The electronic device of claim 2, wherein the connector further includes at least one data pin.

4. A broadcasting signal receiver including an electronic device according to claim 3.

5. The electronic device of claim 2, wherein when the jack of the first external device is connected to the connector, a difference between a voltage of the control pin and a voltage of the ground pin is greater than a predetermined reference voltage,
    wherein when the jack of the second external device is connected to the connector, the difference between the voltage of the control pin and the voltage of the ground pin is less than the predetermined reference voltage.

6. A broadcasting signal receiver including an electronic device according to claim 5.

7. A broadcasting signal receiver including an electronic device according to claim 2.

8. A broadcasting signal receiver including an electronic device according to claim 1.

\* \* \* \* \*